US010394556B2

(12) United States Patent
Shanbhogue et al.

(10) Patent No.: US 10,394,556 B2
(45) Date of Patent: Aug. 27, 2019

(54) HARDWARE APPARATUSES AND METHODS TO SWITCH SHADOW STACK POINTERS

(71) Applicant: Intel Corporation, Santa Clara, CA (US)

(72) Inventors: Vedvyas Shanbhogue, Austin, TX (US); Jason W. Brandt, Austin, TX (US); Ravi L. Sahita, Beaverton, OR (US); Barry E. Huntley, Hillsboro, OR (US); Baiju V. Patel, Portland, OR (US); Deepak K. Gupta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 14/975,840

(22) Filed: Dec. 20, 2015

(65) Prior Publication Data

US 2017/0177339 A1     Jun. 22, 2017

(51) Int. Cl.
*G06F 9/30* (2018.01)
*G06F 9/46* (2006.01)
*G06F 21/52* (2013.01)

(52) U.S. Cl.
CPC ........ *G06F 9/3004* (2013.01); *G06F 9/30134* (2013.01); *G06F 9/461* (2013.01); *G06F 21/52* (2013.01)

(58) Field of Classification Search
None
See application file for complete search history.

(56) References Cited

U.S. PATENT DOCUMENTS 3,794,980 A * 2/1974 Cogar .................... G06F 9/321
                                                                711/213
5,287,309 A * 2/1994 Kai ........................ G06F 7/785
                                                                365/189.04
5,499,349 A    3/1996 Nikhil et al.
(Continued)

FOREIGN PATENT DOCUMENTS

KR    20080075175 A    8/2008

OTHER PUBLICATIONS

International Search Report and Written Opinion for Application No. PCT/US2016/034364, dated Sep. 13, 2016, 12 pages.
(Continued)

*Primary Examiner* — Corey S Faherty
(74) *Attorney, Agent, or Firm* — Nicholson De Vos Webster & Elliott LLP

(57) ABSTRACT

Methods and apparatuses relating to switching of a shadow stack pointer are described. In one embodiment, a hardware processor includes a hardware decode unit to decode an instruction, and a hardware execution unit to execute the instruction to: pop a token for a thread from a shadow stack, wherein the token includes a shadow stack pointer for the thread with at least one least significant bit (LSB) of the shadow stack pointer overwritten with a bit value of an operating mode of the hardware processor for the thread, remove the bit value in the at least one LSB from the token to generate the shadow stack pointer, and set a current shadow stack pointer to the shadow stack pointer from the token when the operating mode from the token matches a current operating mode of the hardware processor.

24 Claims, 13 Drawing Sheets

(56) References Cited

U.S. PATENT DOCUMENTS

| | | |
|---|---|---|
| 5,862,400 A | 1/1999 | Reed et al. |
| 6,128,728 A | 10/2000 | Dowling |
| 7,086,088 B2 | 8/2006 | Narayanan |
| 7,581,089 B1 | 8/2009 | White |
| 9,501,637 B2 | 11/2016 | Lemay et al. |
| 2002/0019902 A1 | 2/2002 | Christie |
| 2003/0196076 A1 | 10/2003 | Zabarski et al. |
| 2004/0221141 A1* | 11/2004 | Padmanabhan ....... G06F 9/3004 712/228 |
| 2005/0044292 A1 | 2/2005 | McKeen |
| 2009/0320129 A1 | 12/2009 | Pan et al. |
| 2010/0115243 A1 | 5/2010 | Kissell |
| 2010/0293342 A1* | 11/2010 | Morfey ............... G06F 9/30032 711/154 |
| 2012/0030392 A1 | 2/2012 | Norden et al. |
| 2012/0036299 A1 | 2/2012 | Renno et al. |
| 2012/0036341 A1 | 2/2012 | Morfey et al. |
| 2014/0283088 A1 | 9/2014 | Alharbi et al. |
| 2014/0365742 A1 | 12/2014 | Patel et al. |
| 2015/0278516 A1 | 10/2015 | Caprioli et al. |
| 2016/0381050 A1 | 12/2016 | Shanbhogue et al. |
| 2017/0228535 A1 | 8/2017 | Shanbhogue |

OTHER PUBLICATIONS

International Search Report and Written Opinion for Application No. PCT/US2016/063207, dated Feb. 27, 2017, 9 pages.

International Search Report and Written Opinion for Application No. PCT/US2017/012572, dated Apr. 4, 2017, 13 pages.

Non-final Office Action from U.S. Appl. No. 14/752,221, dated May 8, 2017, 23 pages.

Rajadurai A., "SPARC M7 Chip—32 cores—Mind Blowing performance," Oracle Angelo's Soapbox Blog, Aug. 15, 2014, downloaded from https://blogs.oracle.com/rajadurai/sparc-m7-chip-32-cores-mind-blowing-performance-v2 on Aug. 10, 2017, 7 pages.

Final Office action from U.S. Appl. No. 14/752,221, dated Mar. 7, 2018, 28 pages.

\* cited by examiner

RESTORE SHADOW STACK POINTER PSEUDOCODE 500

01: SSP_LA = Linear_Address(mem operand)
02: IF SSP_LA not aligned to 8 bytes
03: THEN #GP(0); FI;
    Atomic Start;
04: SSP_Tmp = Locked shadow_Stack_Load with store intent 8 bytes from SSP_LA; Fault = 0;
05: IF ((SSP_Tmp & 0x01) != (EFER.LMA & CS.L))
    THEN fault = 1; FI;
06: IF ((EFER.LMA AND CS.L) = 0 AND SSP_Tmp[63:32] != 0)
    THEN fault = 1; FI;
07: TMP = SSP_Tmp & ~0x01
08: TMP = TMP & ~0x07
09: TMP = (TMP – 8)
10: IF TMP != SSP_LA
    THEN fault = 1; FI;
11: TMP = (fault == 0) ? 0 : SSP_Tmp
12: Shadow_stack_store 8 bytes of TMP to SSP_LA and release lock;
    Atomic End;
13: IF fault == 1
    THEN #CP(rstorssp); FI;
14: SSP = SSP_Tmp & ~0x01

FIG. 5

SAVE SHADOW STACK POINTER PSEUDOCODE 400

01: temp = (SSP | (EFER.LMA & CS.L));
02: SSP = SSP & ~0x07;
03: ShadowStackPush8B(temp);

FIG. 4

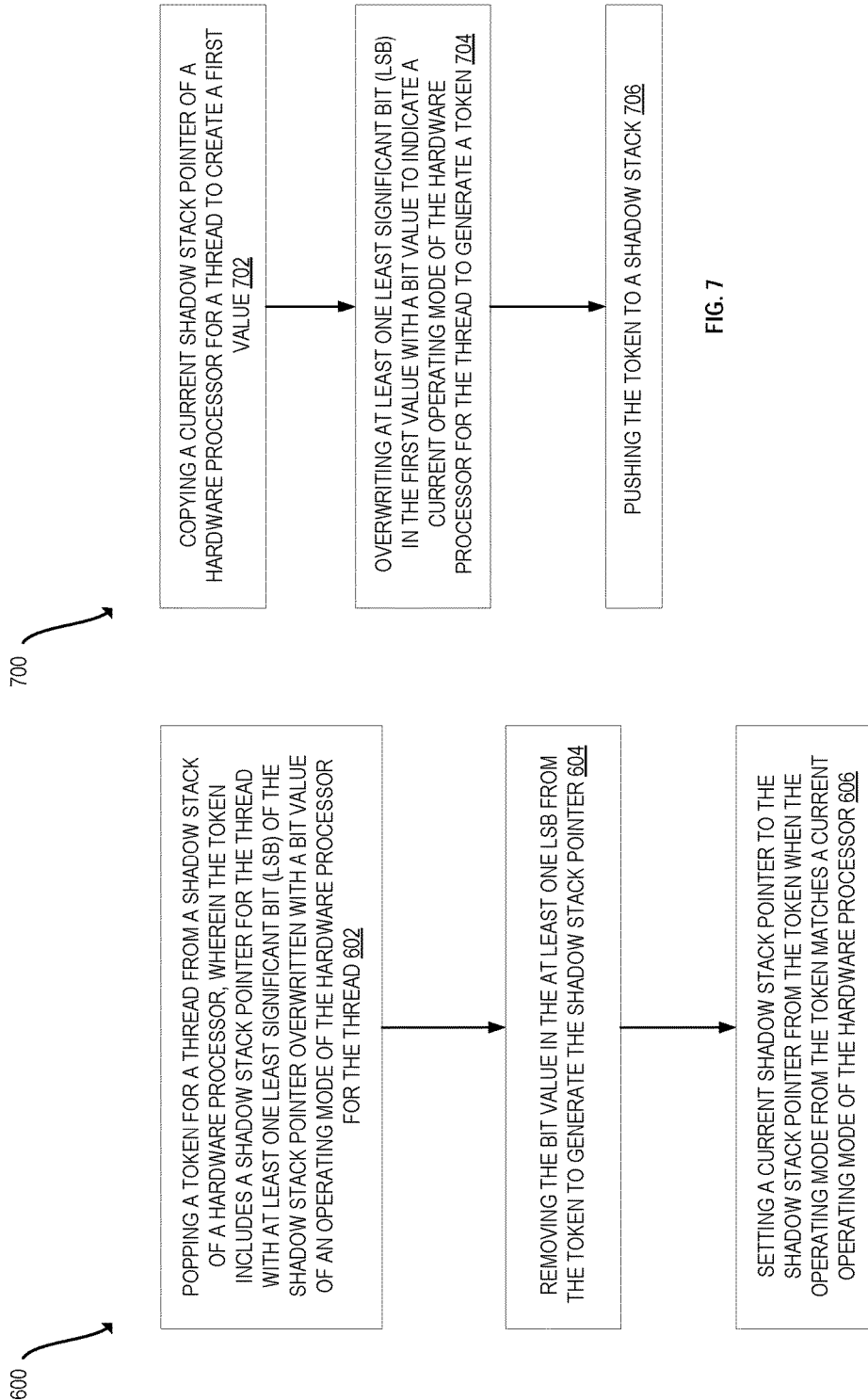

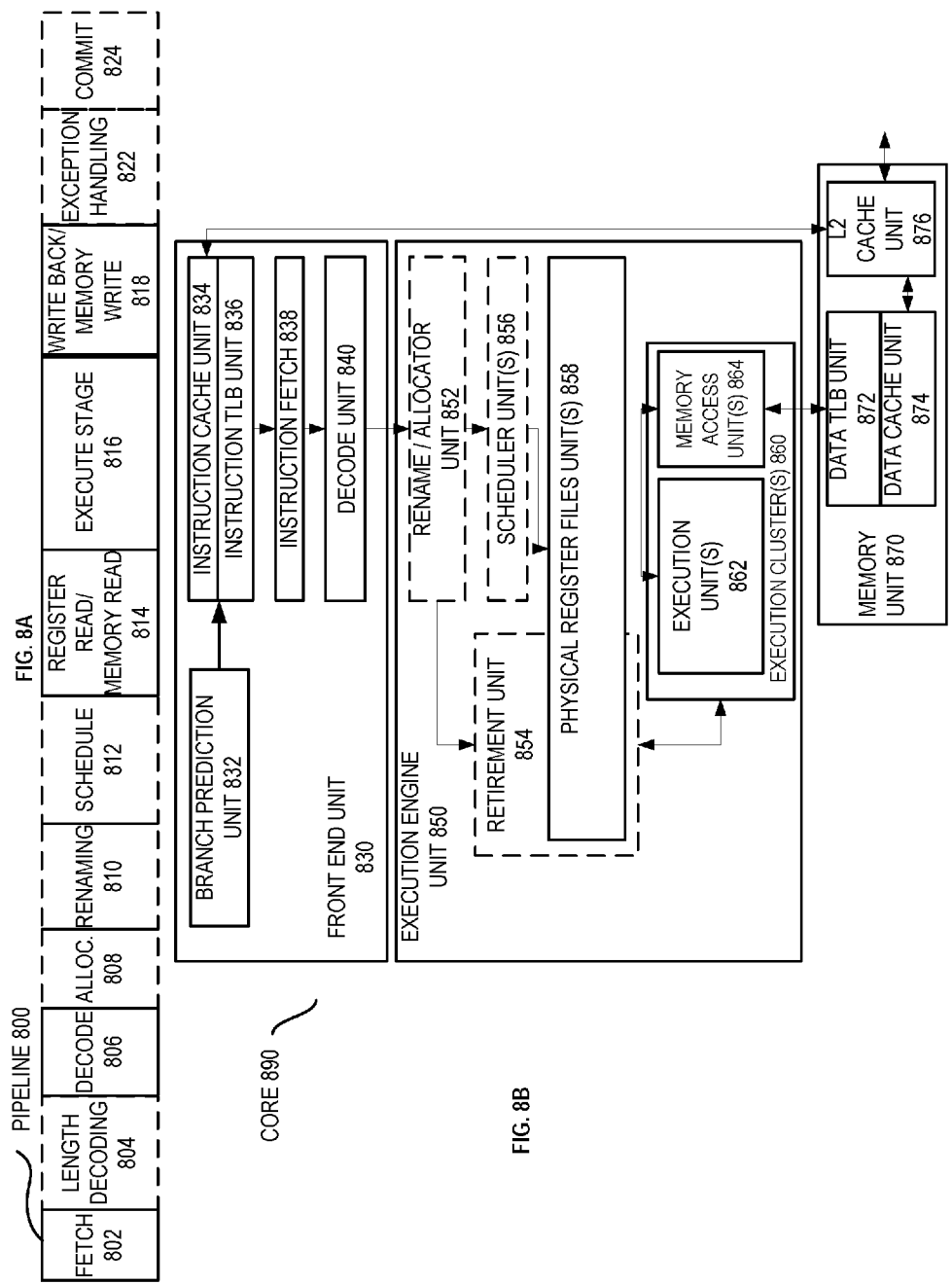

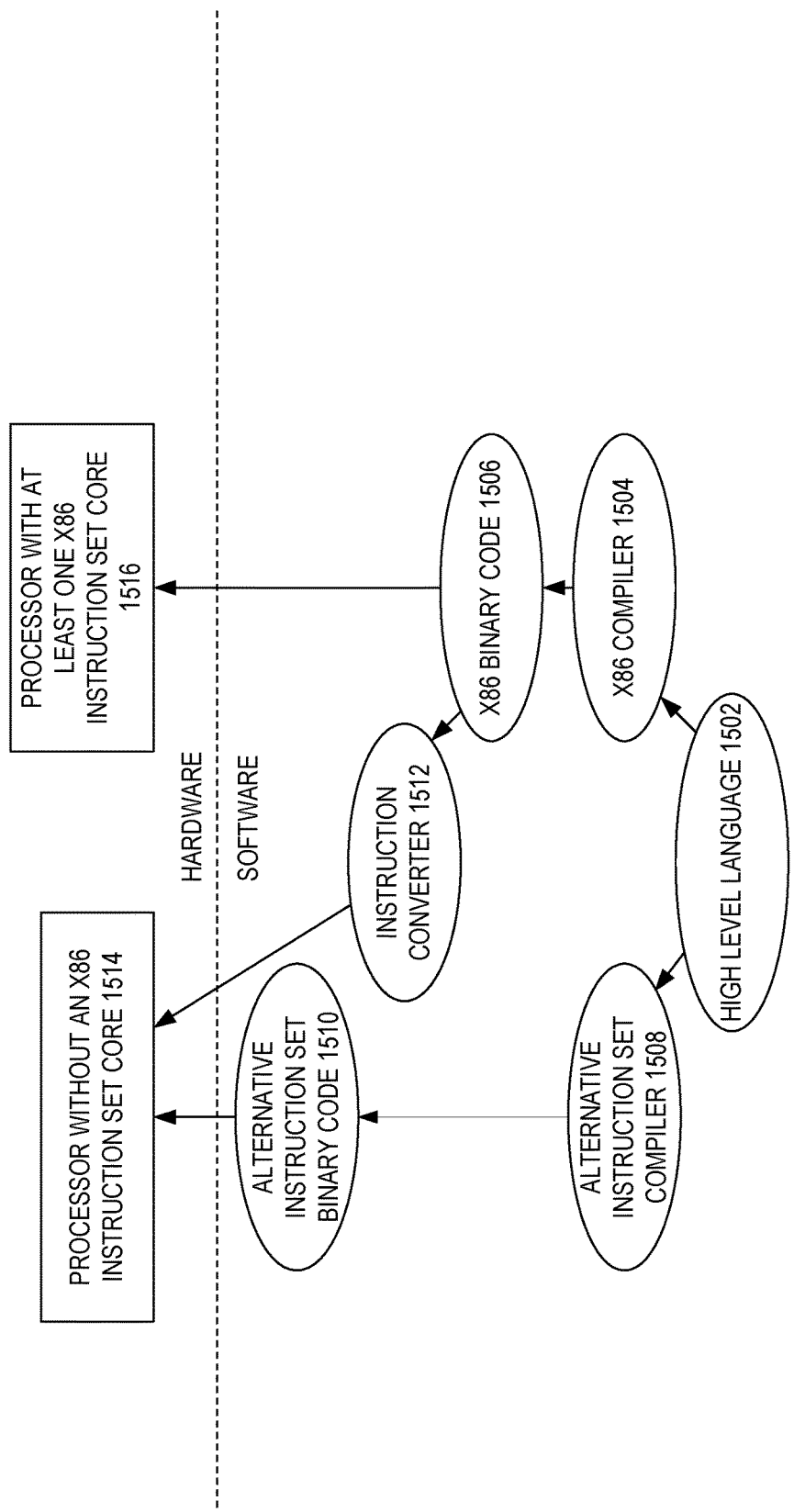

US 10,394,556 B2

HARDWARE APPARATUSES AND METHODS TO SWITCH SHADOW STACK POINTERS

TECHNICAL FIELD

The disclosure relates generally to electronics, and, more specifically, an embodiment of the disclosure relates to a hardware processor to switch shadow stack pointers.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 4 illustrates pseudocode of a shadow stack pointer save operation according to embodiments of the disclosure.

FIG. 5 illustrates pseudocode of a shadow stack pointer restore operation according to embodiments of the disclosure.

FIG. 6 illustrates a flow diagram according to embodiments of the disclosure.

FIG. 7 illustrates a flow diagram according to embodiments of the disclosure.

FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

FIG. 15 is a block diagram contrasting the use of a software instruction converter to convert binary instructions in a source instruction set to binary instructions in a target instruction set according to embodiments of the disclosure.

DETAILED DESCRIPTION

Figure 1:
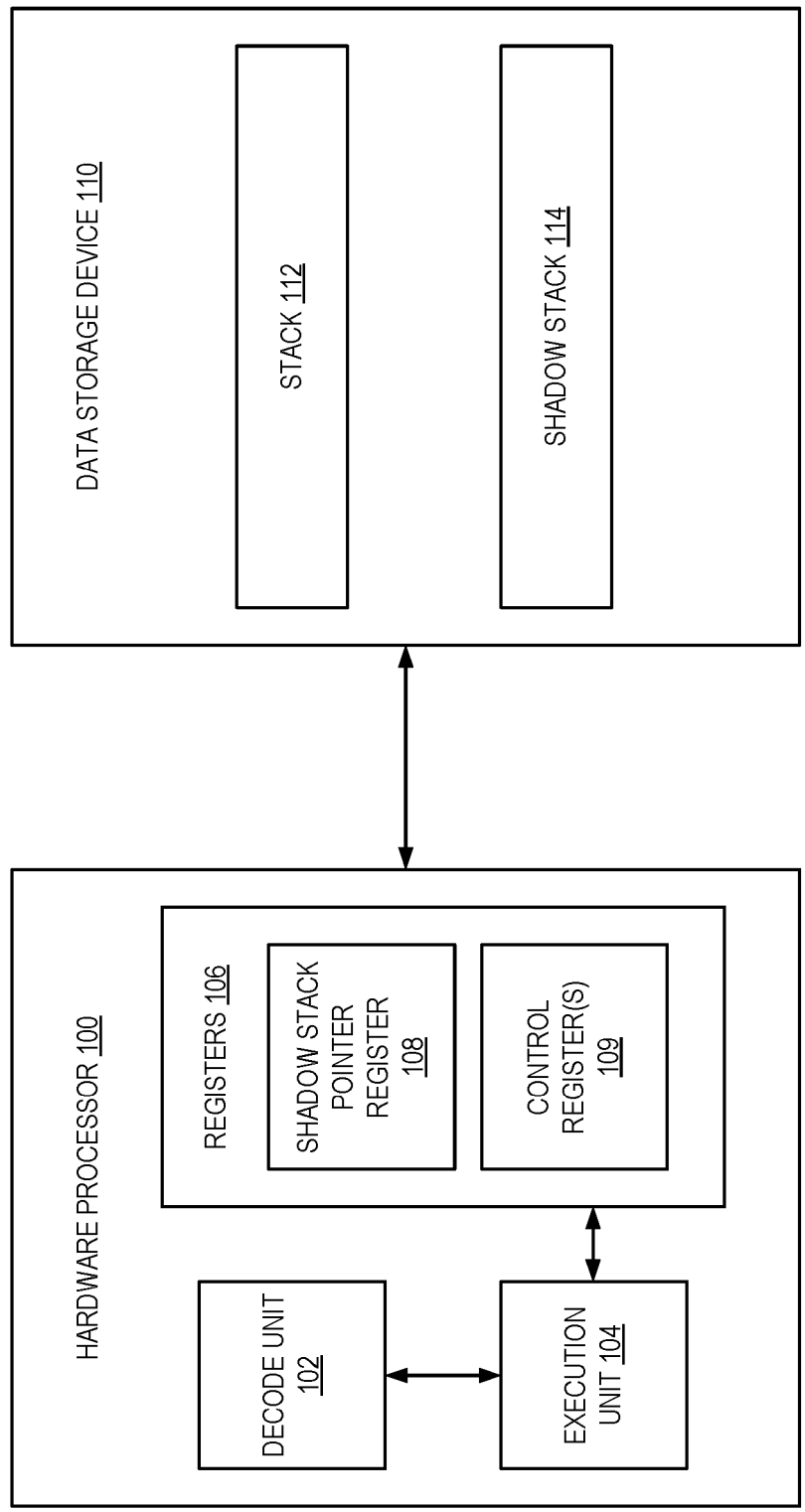
FIG. 1 illustrates a hardware processor coupled to a shadow stack according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. A hardware processor may execute a thread (e.g., of instructions) on data. A hardware processor may switch between executing multiple threads, for example, where each thread includes a context. For example, a hardware processor may switch a first thread's context out for a second thread's context to start executing the second thread, e.g., and stop executing the first thread.

A (e.g., hardware and/or software) stack may be used to push (e.g., load data onto the stack) and/or pop (e.g., remove or pull data from the stack). In one embodiment, a stack is a last in, first out (LIFO) data structure. As examples, a stack may be a call stack, data stack, or a call and data stack. In one embodiment, a context for a first thread may be pushed and/or popped from a stack. For example, a context for a first thread may be pushed to a stack when switching to a second thread (e.g., and its context). Context (e.g., context data) sent to the stack may include (e.g., local) variables and/or bookkeeping data for a thread. A stack pointer (e.g., stored in a register) may be incremented or decremented to point to a desired element of the stack. Certain embodiments herein may provide protection from the undesired modification (e.g., incrementing or decrementing) of a stack pointer.

Return-oriented programming (ROP), jump-oriented programming (JOP), and context-oriented programming (COP) are examples of computer security exploit techniques that attackers may use to gain control over computer systems (or other electronic devices), e.g., to perform malicious actions. In these techniques, the attacker generally gains control of a stack (e.g., call stack) in order to take control of (e.g., hijack) program control flow. Control of the stack (e.g., call stack) may be achieved through a buffer overrun exploit or attack. For example, a thread (e.g., section) of instructions may end with a (e.g., programmer-intended or unintended) return instruction within the existing program code. If the return address (e.g., stack pointer) is modified by an attacker, the execution of the return instruction may transfer execution to the attacker chosen return address (e.g., from the stack) and allow the attacker to retain execution control through the program code, for example, and thus direct execution to the next set of instructions to achieve the attackers intent. A set of attacker chosen instruction sequences may be referred to as gadgets.

In certain embodiments, a shadow stack is used, for example, in addition to a (e.g., separate) stack (e.g., as discussed herein). In one embodiment, the term shadow stack may generally refer to a stack to store control information, e.g., information that can affect program control flow or transfer. In one embodiment, a shadow stack may store control information (e.g., pointer(s) or other address(es)) for a thread, for example, and a (e.g., data) stack may store other data, for example, (e.g., local) variables and/or bookkeeping data for a thread.

In certain embodiments, one or more shadow stacks may be included and used to protect an apparatus and/or method from tampering and/or increase security. The shadow stack(s) (e.g., shadow stack 114 in FIG. 1) may represent one or more additional stack type of data structures that are separate from the stack (e.g., stack 112 in FIG. 1). In one embodiment, the shadow stack (or shadow stacks) is used to store control information but not data (e.g., not parameters and other data of the type stored on the stack, e.g., that user-level application programs are to write and/or modify). In one embodiment, the control information stored on the shadow stack (or stacks) is return address related information (e.g., actual return address, information to validate return address, and/or other return address information). In one example, the shadow stack is used to store copies of a return addresses for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP), e.g., that identifies the most recent element (e.g., top) of the shadow stack. In certain embodiments, the shadow stack may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one embodiment, multiple shadow stacks may be included, but only one shadow stack (e.g., per logical processor) at a time may be allowed to be the current shadow stack. In certain embodiments, there is a (e.g., one) register of the processor to store the (e.g., current) shadow stack pointer.

In one embodiment, an attacker may attempt to take control over the shadow stack (e.g., and thus take control over the processor and/or software running on the processor). For example, an attacker may attempt to change the shadow stack pointer, for example, to change the pointer to shift the execution to a section of (e.g., malicious) software provided by the attacker. Certain embodiments herein provide security for the shadow stack (e.g., in storing and/or restoring a shadow stack pointer). Certain embodiments herein allow stack pointer switching (e.g., in user mode by user mode thread schedulers and/or without invoking an (e.g., call to) operating system) without compromising the integrity of the shadow stack. Certain embodiments herein save a shadow stack context and/or restore a shadow stack context to allow a secure shadow stack switch, e.g., without invoking the operating system. Certain embodiments herein ensure that a shadow stack is to be switched to only valid shadow stacks setup by the operating system for that program. Certain embodiments herein ensure that a user program (e.g., with user level privilege) is not able to manipulate the shadow stack pointer, e.g., arbitrarily. In one embodiment, a user program (e.g., with user level privilege) has a lower privilege (e.g., what actions may be taken) than an operating system.

FIG. 1 illustrates a hardware processor 100 coupled to a shadow stack 114 according to embodiments of the disclosure. Depicted hardware processor 100 includes a hardware decode unit 102 (e.g., decoder) and hardware execution unit 104. Depicted hardware processor 100 includes registers 106. Registers may include one or more of a shadow stack pointer register 108. Registers may include one or more control registers 109, for example, to set and/or read a (e.g., selectable) feature of a processor. One embodiment of a feature is an operating mode of the processor. For example, the current operating mode of the processor may be selectable between a first operating mode with a first address size and/or operand size and a second operating mode with a second, larger address size and/or operand size. A processor may include a control register or registers, for example, an extended feature enable register (EFER) to indicate which (e.g., one) of multiple operating modes a processor is currently operating. In one embodiment, a control register (e.g., EFER) may include a field (e.g., a bit or flag therein) that is set to indicate if a hardware processor is operating in 32 bit operating mode or 64 bit operating mode. In one embodiment, a control register (e.g., EFER) may include a field (e.g., a bit or flag therein) that is set to indicate if a hardware processor is operating in 32 bit operating mode, 64 bit operating mode, or a compatibility mode that can run 32 bit and 64 bit instructions and/or data. In one embodiment, a control register may include a field (e.g., to set a flag therein) that is set to indicate if a (e.g., same) hardware processor (e.g., a core of multiple cores thereof) is operating in one of 32 bit operating mode and 64 bit operating mode. In one embodiment, a 32 bit operating mode refers to a processor to execute according to a 32 bit address size and/or a 32 bit operand size. In one embodiment, a 64 bit operating mode refers to a processor to execute according to a 64 bit address size and/or a 64 bit operand size. Additionally or alternatively, a data structure (e.g., a global descriptor table (GDT) or a local descriptor table (LDT)) may be included to set and/or read a (e.g., selectable) feature of a processor.

Depicted hardware processor 100 may communicate with (e.g., be coupled with) a data storage device 110 (e.g., memory). Data storage device (or other device in communication with the hardware processor) may include a (e.g., data) stack 112 and/or a shadow stack 114. Shadow stack 114 may store a context for a thread, for example, that includes a shadow stack pointer, e.g., for that context. Shadow stack pointer may be an address, e.g., a linear address or other value to indicate a value of the stack pointer. In one embodiment, each respective linear address specifies a different byte in memory (e.g., in a stack).

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decode unit 102 may receive an instruction (e.g., macro-instruction) and decode the instruction. Hardware execution unit 104 may execute the decoded instruction (e.g., macro-instruction) to perform an operation or operations. For example, a first instruction to be decoded by decode unit 102 and executed by execution unit 104 may be a save shadow stack pointer instruction, e.g., that when executed, is to push a shadow stack pointer onto a stack (e.g., shadow stack 114). For example, a second instruction to be decoded by decode unit 102 and executed by execution unit 104 may be a restore shadow stack pointer instruction, e.g., that when executed, is to pop (e.g., pull) a shadow stack pointer from a stack (e.g., shadow stack 114). For example, a stack pointer may be an address (or a reference to an address) for an inactive element (e.g., frame) on a stack. In one embodiment, the stack pointer for a data set to be pushed onto the (e.g., shadow) stack is included as one part (e.g., at the top) of that data set. In one embodiment, the control information (e.g., shadow stack pointer) is pushed or popped to a shadow stack and an associated entry for other information is pushed or popped accordingly to a data stack.

In one embodiment, a (e.g., user level) request (e.g., from a thread that is a user level privilege thread) to switch a context (e.g., push and/or pop a shadow stack pointer) may be received. In one embodiment, a request to switch a context includes pushing or popping from a stack one or more other items of data in addition to a stack pointer. In one embodiment, program code (e.g., software) executing in user level may request a push or a pop of a (e.g., shadow) stack. In certain embodiments, a request is the issuance of an instruction to a processor for decode and/or execution. For example, a request for a pop of a shadow stack pointer from a shadow stack may include executing a restore shadow stack pointer instruction. For example, a request for a push of a shadow stack pointer to a shadow stack may include executing a save shadow stack pointer instruction.

In certain embodiments, an instruction (e.g., a save shadow stack pointer instruction), when executed, is to cause a shadow stack pointer to be pushed to a shadow stack, for example, a shadow stack pointer pushed to the shadow stack in a token according to this disclosure. In certain embodiments, an instruction (e.g., a restore shadow stack pointer instruction), when executed, is to cause a shadow stack pointer to be popped from a shadow stack, for example, a token including the shadow stack pointer popped from the shadow stack according to this disclosure. In certain embodiments, an instruction (e.g., a save shadow stack pointer instruction), when executed, is to cause the alignment of the shadow stack to the next (for example, with a pointer increasing in address from the top of the stack (e.g., most recently pushed onto the stack) to the bottom of the stack) boundary address and cause a token to be pushed onto the stack. An instruction (e.g., a save shadow stack pointer instruction and/or a restore shadow stack pointer instruction) may have the right to access a (e.g., private) shadow stack.

Figure 2:
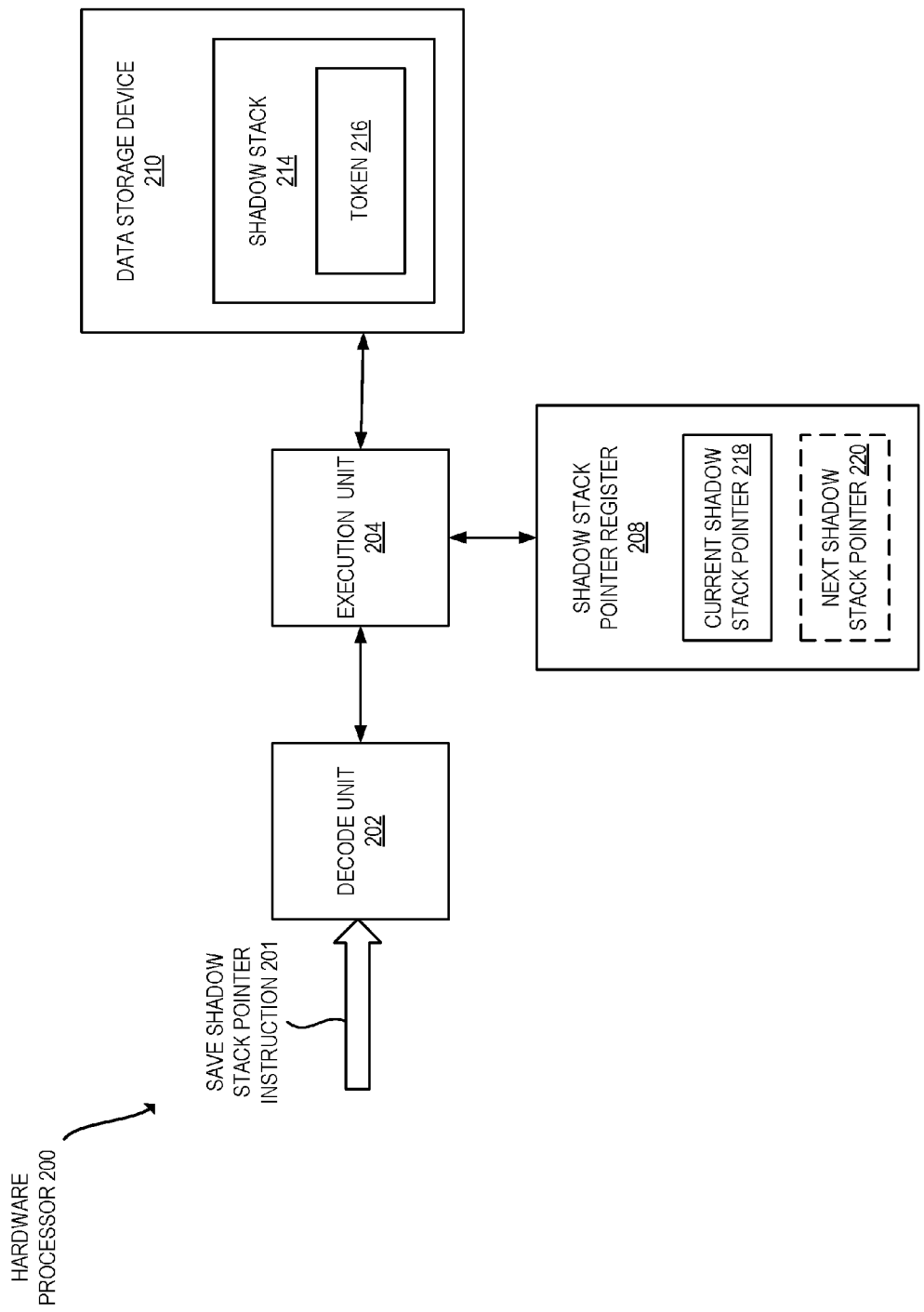
FIG. 2 illustrates a hardware processor to decode and execute a save shadow stack pointer instruction according to embodiments of the disclosure.

FIG. 2 illustrates a hardware processor 200 to decode and execute a save shadow stack pointer instruction 201 according to embodiments of the disclosure. Instruction 201 (e.g., single instruction) may be decoded (e.g., into micro-instructions and/or micro-operations) by decode unit 202 and the decoded instruction may be executed by the execution unit 204. Shadow stack 214 may be a data structure in data storage device 210. Current shadow stack pointer 218 may be stored in a shadow stack pointer register 208. A next shadow stack pointer 220 may refer to the next shadow stack pointer that is to be written to (e.g., overwrite) current shadow stack pointer 218. Shadow stack pointer may be located in a location besides a register in another embodiment. Current operating mode (for example, of the processor 200, e.g., the decode unit 202 and execution unit 204) may be stored in a register, e.g., in a control register.

In certain embodiments, an instruction (e.g., a save shadow stack pointer instruction 201), when executed, is to cause the alignment of the shadow stack 214 to the next (for example, with a pointer increasing in address from the top of the stack (e.g., most recently pushed onto the stack) to the bottom of the stack) boundary address and/or a token 216 to be pushed onto the stack. Although a single token 216 is shown in shadow stack 214, multiple tokens (and their associated other data) may be pushed and/or pulled from a stack. An instruction may be executed in response to a (e.g., user level) request (e.g., from a thread that is a user level privilege thread) to push a shadow stack pointer (e.g., current shadow stack pointer 218) onto shadow stack.

In one embodiment, a token includes (e.g., although not explicitly) the value of the shadow stack pointer (e.g., at the time of invoking the instruction) along with one or more bits (e.g., least significant bits (LSB)) indicating the operating mode of the processor (e.g., at the time of invoking the instruction). For example, a shadow stack pointer may be used by a processor only when it is (e.g., byte) aligned, for example, to create one or more zeros (e.g., of a binary zero and one format) in the least significant bits of the value of the shadow stack pointer. Those least significant bits may be utilized by the processor to store processor information, for example, the current operating mode (e.g., of the thread whose shadow stack pointer is to be pushed to the shadow stack). In one embodiment, the token is 8 bytes and the last and/or second to last bits may be used to store the operating mode, e.g., the operating mode of the thread whose shadow stack pointer is to be pushed onto the stack. In one embodiment, the token is sized smaller than the address size and/or operand size, e.g., of all operating modes of the hardware processor.

A processor (e.g., an execution unit) may include a circuit to check that the (e.g., desired) least significant bits are not set high (e.g., not set to one in binary format) before overwriting (e.g., performing a write to) those least significant bits. In one embodiment, a processor is to fault (for example, to cause a rollback or not persist any change(s) caused by the execution of the save shadow stack pointer instruction, e.g., to the shadow stack and/or the associated entry in a data stack) if any of the checked least significant bits of the shadow stack pointer are set high.

In one embodiment, the processor (e.g., an execution unit) includes a circuit to check that the shadow stack pointer is byte aligned, e.g., such that all bits below the eighth bit are zero. In one embodiment, the processor (e.g., an execution unit) includes a circuit to check that the shadow stack pointer is byte aligned for multiple bytes, for example, 4 byte aligned (e.g., in 32 bit operating mode) or 8 byte aligned (e.g., in 64 bit operating mode). For example, a 4 byte alignment may include each shadow stack pointer having bits 1 and 0 being zero. For example, an 8 byte alignment may include each shadow stack pointer having bits 2, 1, and 0 being zero.

In one embodiment, a hardware processor has a plurality of selectable operating modes and two operating modes have different address sizes, e.g., 32 bit address size for a first operating mode and a 64 bit address size for a second operating mode. In one embodiment, one or more (e.g., least significant) bits of a shadow stack pointer to be pushed onto a shadow stack are to always be set low (e.g., zero in binary format), for example, owing to a required (e.g., byte) alignment of each shadow stack pointer (e.g., an address of the shadow stack). In this embodiment, the one or more (e.g., least significant) bits (e.g., not all of the bits of the shadow stack pointer) that are always set low are used to store a bit value to indicate an operating mode of the context corresponding to the shadow stack pointer, for example, where 0 or 1 is to indicate a first (e.g., 32 bit) operating mode and the other of 0 or 1 is to indicate a second (e.g., 64 bit), different operating mode. For example, using a single bit may indicate one of two operating modes, using two bits may indicate one of four operating modes, etc.

In one embodiment, a processor is to copy the current shadow stack pointer to storage (e.g., a register) to create a first value (e.g., in that register). A processor (e.g., an execution unit) may include a circuit to set the one or more (e.g., least significant) bits (e.g., least significant bit or bits that are zero because of the shadow stack pointer (e.g., byte) alignment) of the first value to indicate the (e.g., current) operating mode of the hardware processor to create a token. A token may be pushed to (e.g., the top of) a shadow stack. In one embodiment, a processor (e.g., an execution unit) includes a circuit to add zeros (e.g., zero extending) to the most significant end of the shadow stack pointer, for example, such that a shadow stack pointer (e.g., address) for a first operating mode with a first address size is the same size as a second operating mode with a second, larger address size. For example, a processor may have a shadow stack pointer for a 32 bit address size and (e.g., when preparing a token) zero extend the most significant end to 64 bits, e.g., inserting the 32 bit address in bits 31 to 0 and inserting zeros in bits 63 to 32 (e.g., when preparing a token). In one embodiment, a shadow stack pointer pushed on and/or pulled from a stack is (e.g., to always be) the largest address size of multiple address sizes of multiple operating modes. An address for the token may be saved to memory, e.g., with the context for the thread whose shadow stack pointer was pushed to the shadow stack. Token may be saved across multiple entries on a stack, for example, such that the address of the memory location on the stack that is storing the token is the address of the first entry on the stack.

Figure 3:
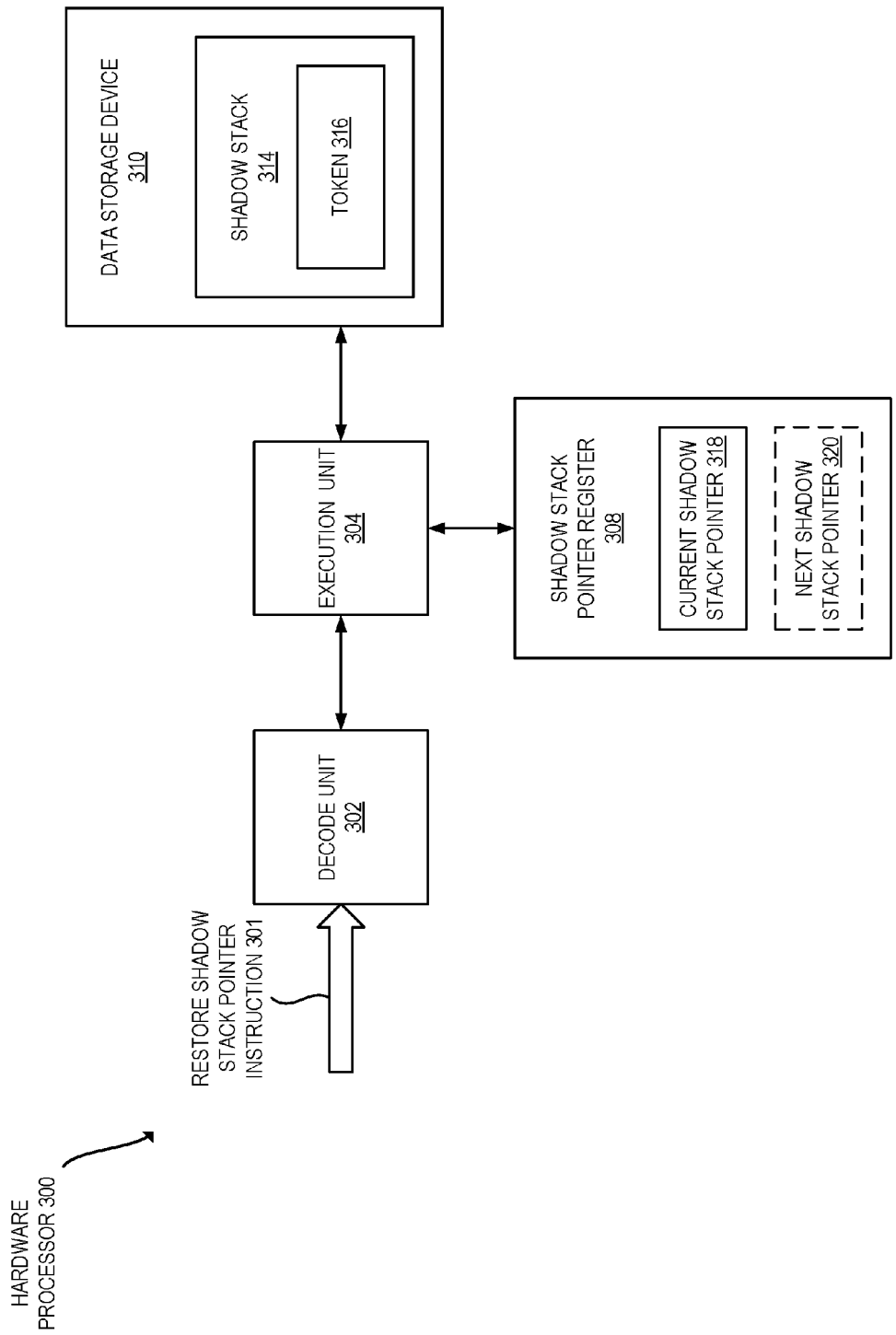
FIG. 3 illustrates a hardware processor to decode and execute a restore shadow stack pointer instruction according to embodiments of the disclosure.

FIG. 3 illustrates a hardware processor 300 to decode and execute a restore shadow stack pointer instruction 301 according to embodiments of the disclosure. Instruction 301 (e.g., single instruction) may be decoded (e.g., into microinstructions and/or micro-operations) by decode unit 302 and the decoded instruction may be executed by the execution unit 304. Shadow stack 314 may be a data structure in data storage device 310. Current shadow stack pointer 318 may be stored in a shadow stack pointer register 308. Next shadow stack pointer 320 may refer to the next shadow stack pointer that is to be written to (e.g., overwrite) current shadow stack pointer 318. Shadow stack pointer may be located in a location besides a register in another embodiment. Current operating mode may be stored (e.g., set) in a register, e.g., in a control register.

In certain embodiments, an instruction (e.g., a restore shadow stack pointer instruction 201), when executed, is to cause the alignment of the shadow stack 314 to the next (for example, with a pointer increasing in address from the top of the stack (e.g., most recently pushed onto the stack) to the bottom of the stack) boundary address and/or a token 316 to be popped from the stack. Although a single token 316 is shown in shadow stack, multiple tokens (and their associated other data) may be pushed and/or pulled from a stack. An instruction may be executed in response to a (e.g., user level) request (e.g., from a thread that is a user level privilege thread) to pop a shadow stack pointer (e.g., next shadow stack pointer 320) from the shadow stack 314.

In certain embodiments, an instruction (e.g., a restore shadow stack pointer instruction 301), when executed, is to cause a shadow stack pointer to be popped from the shadow stack, for example, a shadow stack pointer popped from the shadow stack according to this disclosure. In one embodiment, an instruction, when executed, is to (e.g., allow a thread whose shadow stack pointer is to be popped from the stack to) change the current shadow stack pointer 318 to the shadow stack pointer saved on (e.g., popped from) the shadow stack for the context to be loaded. For example, a token 316 according to any of the disclosure herein may have been pushed onto the shadow stack 314 previously. An instruction 301, when executed, may pull the token 316 from the shadow stack 314 and remove the shadow stack pointer from the token 316 to change the current shadow stack pointer 318 to that shadow stack pointer removed from the token (e.g., to cause the shadow stack pointer from the token 316 to be saved into shadow stack pointer register 308 as the current shadow stack pointer 318). An instruction (e.g., execution thereof) may cause the performance (e.g., by a circuit) of one or more checks, for example, to determine that the token is the correct token (e.g., and not one manipulated by an attacker). An instruction may be executed in response to a (e.g., user level) request (e.g., from a thread that is a user level privilege thread) to push a shadow stack pointer onto a shadow stack. In one embodiment, a request is from or for a thread that is to be executed on the hardware processor and seeking to have it shadow stack pointer as the current shadow stack pointer, e.g., such that the thread may access the shadow stack pointer and thus any information in the shadow stack saved with the shadow stack pointer. In one embodiment, an instruction may include a field (e.g., operand) to indicate the (e.g., linear) address on the shadow stack where the token (e.g., the first entry of multiple entries containing the token) is stored.

In one embodiment, a requestor (e.g., a user level application) specifies the address of a token 316 pushed on the shadow stack 314 by a previous save shadow stack pointer instruction, e.g., the address as an operand. Execution of the instruction may (e.g., cause a circuit to) verify if the address specified is (for example, (e.g., 8) byte) aligned, for example, and fault if not. A processor may (e.g., atomically) load the (e.g., 8 bytes of) token from the address specified. In one embodiment, the loading of a token locks the token and/or the location (e.g., cache line) the token is copied into from modification by another core or processor. Execution of the instruction may (e.g., cause a circuit to) verify if the operating mode (e.g., in one of 32 bit and 64 bit operating mode) of the hardware processor (e.g., core) recorded in the token matches the current mode (or the mode to be used for execution of the token's thread) of the hardware processor. For example, execution of the instruction may (e.g., cause a circuit to) verify if the operating mode bit value stored in the token matches the current mode (or the mode to be used for execution of the token's thread) of the hardware processor, e.g., as read from a control register or other location. Execution of the instruction may (e.g., cause a circuit to) verify if the shadow stack pointer (e.g., in the format of a linear address) stored in the token matches the (e.g., linear) address specified (e.g., as an operand) to the instruction by the requestor. For example, the instruction may (e.g., cause a circuit to) align the shadow stack pointer (e.g., in the form of a linear address) from the token to a next address boundary, remove (e.g., subtract) a size of the token from the next address boundary to generate a second address, and take a fault (e.g., not set the current shadow stack pointer to the shadow stack pointer from the token) when the second address does not match the address (e.g., from the operand of the restore shadow stack pointer instruction) provided by the requestor for the retrieval of the shadow stack pointer.

Execution of the instruction may (e.g., cause a circuit to) perform one or more (e.g., all) of the above verifications (e.g., checks) and update the current shadow stack pointer to the shadow stack pointer in the token if the verifications are true. Certain embodiments herein cause a restore stack pointer operation is be done to restore a shadow stack pointer to a value that matches the shadow stack pointer at the time of a previous save of the shadow stack pointer (e.g., via a save shadow stack pointer operation). Certain embodiments herein (e.g., atomically) clear a token after it has been used (e.g., a successful restoration of the shadow stack pointer from the token as the current shadow stack pointer), for example, to cause a restore shadow stack pointer operation (e.g., instruction) to be performed only on one hardware processor (e.g., logical processor). An operating mode verification may enforce that a shadow stack pointer saved in one operating mode (e.g., 64 bit mode) is not to be used in a second operating mode (e.g., 32 bit mode). Certain embodiments may allow a requestor (e.g., a software application) to (e.g., efficiently) switch stacks in user mode or user space (e.g., without invoking an (e.g., call to) operating system) without having the ability to (e.g., arbitrarily) change the shadow stack pointer (e.g., where the user mode or user space does not have permission to directly modify the shadow stack pointer). In one embodiment, an instruction according to this disclosure may have permission to modify and/or read a shadow stack and/or shadow stack pointer.

In one embodiment, a token may only be loaded from shadow stack memory. In one embodiment, no other hardware processor (e.g., core) may modify a token (e.g., loaded into a register) until the hardware processor releases the lock (e.g., on completion of the restoration of a shadow stack pointer in the token). In one embodiment, a token is only used to restore a shadow stack pointer once, for example, the token is erased after the current shadow stack pointer of a hardware processor is modified to the shadow stack pointer from that token. In certain embodiments, a single decode unit and single execution unit may decode and execute, respectively, save shadow stack pointer instruction 201 and restore shadow stack pointer instruction 301.

In one embodiment, the size of the token is the same for each pop to and pull of a token from a shadow stack. Execution of a restore shadow stack pointer instruction may (e.g., cause a circuit to) remove the one or more bits (e.g., least significant bits (LSB)), which one or more bits may be the same bit location and number of bits in each token from a shadow stack) from the token that indicate the operating mode of the processor (e.g., at the time of invoking the instruction). The value of the token with the removed one or more bits that indicate the operating mode may be the shadow stack pointer, which may then be loaded as the current shadow stack pointer. In one embodiment, the token is 8 bytes and the last and/or second to last bits are used to store the operating mode, for example, removing (e.g., replacing with a zero(s)) those last and/or second to last bits from the token generates (e.g., creates) the shadow stack pointer. The pop of a token 316 from a shadow stack 314 to a cache line(s) of storage may lock those cache line(s) of storage from modification by another hardware processor, for example, until the restore instruction that caused the pop completes execution (e.g., is retired). In one embodiment, the number of bits and the location of the bits in a token that indicate the operating mode of the processor are constant, for example, the same least significant bits are low (e.g., zero) in every shadow stack pointer, e.g., based on the byte alignment. In one embodiment, an address of a token in a shadow stack is the first address (e.g., when the token is stored over multiple memory address locations) of multiple addresses of a single token.

FIG. 4 illustrates pseudocode 400 of a shadow stack pointer save operation, e.g., micro-code for a save shadow stack pointer instruction, according to embodiments of the disclosure. In reference to FIG. 4, EFER may refer to an extended feature enable register, e.g., a special configuration register for a processor that is to run in either 32 bit operating mode or 64 bit operating mode at a time. EFER.LMA may refer to a long mode activity flag in EFER that, e.g., when enabled (e.g., set high), places the hardware processor into long (e.g., 64 bit) mode. Code segment long (CS.L) may refer to a flag in a code segment entry (e.g., of global descriptor table (GDT) or a local descriptor table (LDT)) to indicate long (e.g., 64 bit) mode, e.g., when set high (to one in binary format). In one embodiment, setting CS.L=1 also sets EFER.LMA=1 and/or clearing CS.L also clears EFER.LMA. In one embodiment, when EFER.LMA=1 and CS.L=1, a hardware processor is in long mode (e.g., all instructions and/or addresses are interpreted as 64 bits in size). For example, CS.L=1 and EFER.LMA=1 may indicate 64 bit mode and all other combinations may indicate 32 bit mode.

Line 01 in pseudocode 400 is to create a token (for example, stored in temp (e.g., a register or other memory)) having the value of the result of a bitwise OR operation of the current shadow stack pointer value and the operating mode of the processor (e.g., the operating mode being the result of the bitwise AND operation of the CS.L and EFER.LMA in this example). For example, line 01 may create a (e.g., 8 byte) token holding the current value of the shadow stack pointer and operating mode of the processor (e.g., logical processor), e.g., that is running the thread to have its shadow stack pointer pushed to a shadow stack. In one embodiment, the shadow stack pointer is (e.g., always) 4 byte aligned in 32 bit mode and thus bits 1 and 0 are (e.g., always) 0 and the shadow stack pointer is (e.g., always) 8 byte aligned in 64 bit mode and thus (e.g., least significant) bits 2, 1 and 0 are (e.g., always) 0. In such embodiments, the operating mode of the machine may be stored in the overlap of those values that are zero, for example, in bit 0 and/or bit 1 of the temporary variable (temp). In one embodiment, the operating mode of the processor indicates whether this pseudocode was performed in 32-bit operating mode, compatibility operating mode, or 64-bit operating mode, and as one example, in 64 bit mode EFER.LMA is 1 and CS.L is 1 and thus bit 0 in temp may be set to the value of 1. In one embodiment, compatibility bit mode EFER.LMA is 1 and CS.L is 0, and thus bit 0 in temp is set to a value of 0. In one embodiment, in 32-bit mode the EFER.LMA is 0, and thus bit 0 in temp is (e.g., set to) a value of 0.

Line 02 in pseudocode 400 is to align the current shadow stack pointer to the next 8 byte boundary (e.g., based on a 64 bit address for all tokens) to create the next shadow stack pointer to be saved to the current shadow stack pointer to prepare to push the token (e.g., the value in temp). For example, if the shadow stack grows from high address to low address, e.g., as new data is pushed on the shadow stack, the shadow stack pointer decreases (although in another embodiment it may increase). Thus to align the shadow stack pointer in this example to the next 8 byte boundary, Line 02 clears the least significant (e.g., low order) three bits of the shadow stack pointer. For example, if the shadow stack pointer value was 10004 then the next 8 byte aligned location on the shadow stack is 10000.

Line 03 in pseudocode 400 pushes the 8 byte token (e.g., stored in location temp) onto the shadow stack. Other embodiments of a ShadowStackPush operation may push a desired size of token onto a shadow stack. The (e.g., linear) address of the location on the shadow stack where the token is stored may be stored in (e.g., different and/or non-privileged) memory. This may be referred to as the "memory operand" herein.

FIG. 5 illustrates pseudocode 500 of a shadow stack pointer restore operation e.g., micro-code for a restore shadow stack pointer instruction, according to embodiments of the disclosure. The following assumes a token has been previously pushed onto the shadow stack and that information is known about the location on the shadow stack where the token was stored.

Line 01 in pseudocode 500 is to calculate the linear address of the location of the token in the shadow stack specified by the memory (mem) operand.

Line 02 in pseudocode 500 is to check that the linear address of the memory operand is aligned to 8 bytes.

If not, line 03 in pseudocode 500 is to cause a (e.g., general) fault, for example, to end the execution of the pseudocode 500. In one embodiment, the operations between lines 04 and 12 are performed atomically, for example, if any portion fails (e.g., faults), then any changes by those lines are to be rolled back (e.g., undone). In one embodiment, performing an operation atomically implies that once the token has been loaded (e.g., in line 04), the processor locks that cache line such that the token in memory cannot be modified by any other logical processor in the system (e.g., in a central processing unit (CPU)). In one embodiment, the term FI generally refers to an end of a block of pseudocode that begins with the term IF. In one embodiment, a processor and/or method is to generate a fault indication (e.g., set the value of fault to one), for example, and a fault handler may then handle the fault (e.g., detect a fault indication and cause a fault operation to be executed).

Line 04 in pseudocode 500 is to load the 8 byte token pointed to by the (e.g., linear) address specified in the memory operand into location SSP_Tmp and lock that location from modification by any other processor, e.g., by taking ownership of that location (e.g., cache line)). This may also include setting a variable for a fault (e.g., named "fault") to zero as depicted.

Line 05 in pseudocode 500 is to check if the bit value of the current operating mode of the machine matches the bit value of the operating mode in the token (e.g., SSP_Tmp). In one embodiment, bit 0 of the token indicates the operating mode of the processor when the token was created. In one embodiment, this value is to match the current mode of the machine (e.g., as determined by EFER.LMA & CS.L discussed above) or a fault may be generated (e.g., fault=1), and for example, a roll back is then performed.

Line 06 in pseudocode 500 is to check, if the current operating mode of the processor is 32-bit (e.g., or compatibility) mode, then the linear address space in this embodiment is 32 bit and thus the shadow stack pointer value (SSP_Tmp) recorded in the token is to be 64 bits wide with bits 63:32 of the token being 0. If this is not the case then a fault may be generated, and for example, a roll back is then performed.

Line 07 in pseudocode 500 in this example is to remove the bit value of the operating mode, e.g., in the depicted embodiment the bit value is in bit location 0 in the token (SSP_Tmp) and store that back in variable TMP. TMP may now contain the shadow stack pointer from the token popped from the stack.

Lines 08-10 in pseudocode 500 are to check if the shadow stack pointer from the token is the expected value. Line 08 in this example aligns the shadow stack pointer from the token (stored in TMP) to the next 8 byte boundary to create a second value (stored in TMP), line 09 in this example subtracts the size of the token (e.g., 8 bytes) from the second value to create a third value (stored in TMP), and line 10 of this example compares the third value (stored in TMP and from the token) to the shadow stack pointer linear address (e.g., SSP_LA) passed in by the requestor to determine if the shadow stack pointer from the token is the expected value of the shadow stack pointer, and, for example, take a fault if not. For example, where a save shadow stack pointer operation (e.g., according to pseudocode 400) aligns and pushes the 8 byte token which contains the shadow stack pointer value at the time of invoking the save shadow stack pointer operation, at least lines 08-10 may recreate what is expected to be the value following the save shadow stack pointer operation. In one embodiment, this recreated value is to match the linear address of the memory operand (mem operand) provided to the restore shadow stack pointer operation (e.g., according to pseudocode 500). If not a match, then in the depicted embodiment, a fault is generated (e.g., fault=1), and for example, a roll back is then be performed, e.g., shadow stack pointer does not change and the token is to remain on the shadow stack.

Line 11 in pseudocode 500 is to, if there is a match (e.g., no faults), then the 8 byte token may be set to zero, e.g., such that this token cannot be used again. Any locks (e.g., on the cache line referenced by the memory operand SSP_LA) may be released, e.g., in line 12 of pseudocode 500. In one embodiment, ensuring that lines 4-12 are done atomically and by clearing the token in line 11 (e.g., if there are no faults detected) ensures that a restore of the shadow stack pointer in a valid token is done on only one logical processor in a system (e.g., CPU) with multiple logical processors, for example, to prevent conditions where multiple logical processors are executing with the same shadow stack pointer.

Line 13 in pseudocode 500 is to, if a fault if detected (e.g., fault equal to one), cause a control protection (#CP) fault, e.g., with an error code indicating a fault from this (e.g., restore shadow stack pointer) instruction.

Line 14 in pseudocode 500 is to, in no fault is detected (e.g., fault equal to zero), set the current shadow stack pointer to the value of the shadow stack pointer recorded in the token. For example, bit 0 of the token in this embodiment stores the operating mode of the processor so bit 0 is cleared (e.g., set to zero) as the mode related checks are complete.

The following is an example of two instructions that may respectively utilize the pseudocode in FIGS. 4 and 5. In this example, these instructions may perform thread switching in user mode. In this example, the outgoing thread, e.g., the thread being descheduled, is to perform the following steps: execute a save shadow stack pointer instruction according to pseudocode 400 to save the shadow stack pointer at this time along with the operating mode of the processor in a token and push the token onto the (e.g., currently active) shadow stack. In this example, another instruction may read the current shadow stack pointer value in a register and then save this (e.g., linear) address of the top of the shadow stack to the thread context structure of the outgoing thread. In this example, the incoming thread, e.g., the thread being scheduled, may perform the following steps: read that thread's context structure to determine (or obtain) the linear address of the top of the shadow stack, and execute a restore shadow stack pointer instruction according to pseudocode 500 to restore the incoming thread's shadow stack pointer. A memory operand may be provided to the restore shadow stack pointer instruction to specify the address of the token created by a save shadow stack pointer instruction, e.g., the memory operand read from the thread context structure.

In one embodiment, shadow stack load (e.g., shadow_stack_load) and shadow stack store (e.g., shadow_stack_store) operations (e.g., micro-instructions) are different from other (e.g., non shadow stack) load and store operations. In certain embodiments a shadow stack load operation is allowed only to load from memory of type shadow stack, e.g., such that if the address to which the shadow stack load is performed is not of shadow stack type then this operation faults. In certain embodiments, this prevents the use of shadow stack load operation (e.g., a restore shadow stack pointer instruction (e.g., macro-instruction) that includes a shadow stack load operation) from loading from a non shadow stack memory. In certain embodiments, a shadow stack store operation is allowed only to store to memory of type shadow stack, e.g., such that if the address to which the shadow stack store operation is to be performed is not of shadow stack type then this operation faults (e.g., generates a fault indication). In certain embodiments, this prevents a shadow stack store operation (e.g., a save shadow stack pointer instruction (e.g., macro-instruction) that includes a shadow stack store operation) from being used to save (e.g., tricked into saving) to non shadow stack memory, for example, due to the shadow stack pointer being outside of the end of stack.

In certain embodiments, the shadow stack or shadow stacks are located in memory that is marked in page tables as being of shadow stack type, for example, such that non shadow stack (e.g., regular) operations (e.g., operations other than shadow stack load operations and shadow stack store operations) are not allowed to access this memory. In one embodiment, only a save shadow stack instruction (e.g., according to this disclosure) is allowed to write to memory of the shadow stack type (e.g., region). In one embodiment, only control flow instructions (e.g., call (CALL) instructions) and save shadow stack instructions (e.g., according to this disclosure) are allowed to write to memory of the shadow stack type (e.g., region). For example, a save shadow stack (e.g., pointer) instruction that performs a shadow stack store operation may be allowed to write to shadow stack memory but fault (e.g., generate a fault indication) if the memory (e.g., memory address) is not of shadow stack type. In one embodiment, only a restore shadow stack instruction (e.g., according to this disclosure) is allowed to load from memory of the shadow stack type (e.g., region). In one embodiment, only control flow instructions (e.g., return (RET) instructions) and shadow stack restore instructions (e.g., according to this disclosure) are allowed to load from memory of the shadow stack type (e.g., region). For example, a restore shadow stack (e.g., restore shadow stack pointer) instruction that performs a shadow stack load operation may be allowed to load from (e.g., read) from shadow stack memory but fault if the memory (e.g., memory address) is not of shadow stack type.

FIG. 6 illustrates a flow diagram 600 according to embodiments of the disclosure. Flow diagram 600 includes popping a token for a thread from a shadow stack of a hardware processor, wherein the token includes a shadow stack pointer for the thread with at least one least significant bit (LSB) of the shadow stack pointer overwritten with a bit value of an operating mode of the hardware processor for the thread 602, removing the bit value in the at least one LSB from the token to generate the shadow stack pointer 604, and setting a current shadow stack pointer to the shadow stack pointer from the token when the operating mode from the token matches a current operating mode of the hardware processor 606.

FIG. 7 illustrates a flow diagram 700 according to embodiments of the disclosure. Flow diagram 700 includes copying a current shadow stack pointer of a hardware processor for a thread to create a first value 702, overwriting at least one least significant bit (LSB) in the first value with a bit value to indicate a current operating mode of the hardware processor for the thread to generate a token 704, and pushing the token to a shadow stack 706.

In one embodiment, a hardware processor includes a hardware decode unit to decode an instruction, and a hardware execution unit to execute the instruction to: pop a token for a thread from a shadow stack, wherein the token includes a shadow stack pointer for the thread with at least one least significant bit (LSB) of the shadow stack pointer overwritten with a bit value of an operating mode of the hardware processor for the thread, remove the bit value in the at least one LSB from the token to generate the shadow stack pointer, and set a current shadow stack pointer to the shadow stack pointer from the token when the operating mode from the token matches a current operating mode of the hardware processor and/or not set the current shadow stack pointer to the shadow stack pointer from the token when the operating mode from the token does not match the current operating mode of the hardware processor. The operating mode of the hardware processor may be selectable between a first operating mode with a first address size and a second operating mode with a second, larger address size. The size of the token may be the second, larger address size for both of a token for a thread in the first operating mode and a token for a thread in the second operating mode. The processor (e.g., the hardware execution unit) may generate a fault indication (e.g., a fault) when an address of the token on the shadow stack is not a shadow stack address. An address for the token may be an operand of the instruction. The hardware execution unit may execute the instruction to: align the shadow stack pointer from the token to a next address boundary, remove a size of the token from the next address boundary to generate a second address, and not set the current shadow stack pointer to the shadow stack pointer from the token when the second address does not match the address from the operand of the instruction. The hardware execution unit may execute the instruction to clear the token from the shadow stack when the current shadow stack pointer is to be set to the shadow stack pointer from the token. The hardware decode unit may decode a second instruction, and the hardware execution unit may execute the second instruction to: copy the current shadow stack pointer for the thread to create a first value, set at least one least significant bit (LSB) in the first value to indicate a current operating mode of the hardware processor to generate a second token, and push the second token to the shadow stack.

In another embodiment, a method includes popping a token for a thread from a shadow stack of a hardware processor, wherein the token includes a shadow stack pointer for the thread with at least one least significant bit (LSB) of the shadow stack pointer overwritten with a bit value of an operating mode of the hardware processor for the thread, removing the bit value in the at least one LSB from the token to generate the shadow stack pointer, and setting a current shadow stack pointer to the shadow stack pointer from the token when the operating mode from the token matches a current operating mode of the hardware processor and/or not setting the current shadow stack pointer to the shadow stack pointer from the token when the operating mode from the token does not match the current operating mode of the hardware processor. The operating mode of the hardware processor may be selectable between a first operating mode with a first address size and a second operating mode with a second, larger address size. The size of the token may be the second, larger address size for both of a token for a thread in the first operating mode and a token for a thread in the second operating mode. The method may include generating a fault indication (e.g., a fault) when an address of the token on the shadow stack is not a shadow stack address. The method may include providing an address for the token in a request to set the current shadow stack pointer. The method may include aligning the shadow stack pointer from the token to a next address boundary, removing a size of the token from the next address boundary to generate a second address, and not setting the current shadow stack pointer to the shadow stack pointer from the token when the second address does not match the address provided in the request to set the current shadow stack pointer. The method may include clearing the token from the shadow stack when the current shadow stack pointer is to be set to the shadow stack pointer from the token. The method may include copying the current shadow stack pointer for the thread to create a first value, setting at least one least significant bit (LSB) in the first value to indicate a current operating mode of the hardware processor to generate a second token, and pushing the second token to the shadow stack.

In yet another embodiment, a hardware processor includes a hardware decode unit to decode an instruction, and a hardware execution unit to execute the instruction to: copy a current shadow stack pointer for a thread to create a first value, overwrite at least one least significant bit (LSB) in the first value with a bit value to indicate a current operating mode of the hardware processor for the thread to generate a token, and push the token to a shadow stack. The current operating mode of the hardware processor may be selectable between a first operating mode with a first address size and a second operating mode with a second, larger address size. The size of the token may be the second, larger address size for both of a token for a thread in the first operating mode and a token for a thread in the second operating mode. The processor (e.g., hardware execution unit) may generate a fault indication (e.g., a fault) when an address where the token is to be pushed is not a shadow stack address The hardware execution unit may execute the instruction to: align the current shadow stack pointer from the token to a next address boundary to generate a second value, and set the second value as a next shadow stack pointer. The hardware decode unit may decode a second instruction, and the hardware execution unit may execute the second instruction to: pop the token for the thread from the shadow stack, remove the bit value in the at least one LSB from the token to generate a new shadow stack pointer, and set a next shadow stack pointer to the new shadow stack pointer from the token when an operating mode from the token matches the current operating mode of the hardware processor and/or not set the next shadow stack pointer to the new shadow stack pointer from the token when the operating mode from the token does not match the current operating mode of the hardware processor.

In another embodiment, a method includes copying a current shadow stack pointer of a hardware processor for a thread to create a first value, overwriting at least one least significant bit (LSB) in the first value with a bit value to indicate a current operating mode of the hardware processor for the thread to generate a token, and pushing the token to a shadow stack. The current operating mode of the hardware processor may be selectable between a first operating mode with a first address size and a second operating mode with a second, larger address size. The size of the token may be the second, larger address size for both of a token for a thread in the first operating mode and a token for a thread in the second operating mode. The method may include generating a fault indication (e.g., a fault) when an address where the token is to be pushed is not a shadow stack address. The method may include aligning the current shadow stack pointer from the token to a next address boundary to generate a second value, and setting the second value as a next shadow stack pointer. The method may include popping the token for the thread from the shadow stack, removing the bit value in the at least one LSB from the token to generate a new shadow stack pointer, and setting a next shadow stack pointer to the new shadow stack pointer from the token when an operating mode from the token matches the current operating mode of the hardware processor and/or not setting the next shadow stack pointer to the new shadow stack pointer from the token when the operating mode from the token does not match the current operating mode of the hardware processor.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2015; and see Intel® Architecture Instruction Set Extensions Programming Reference, August 2015).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
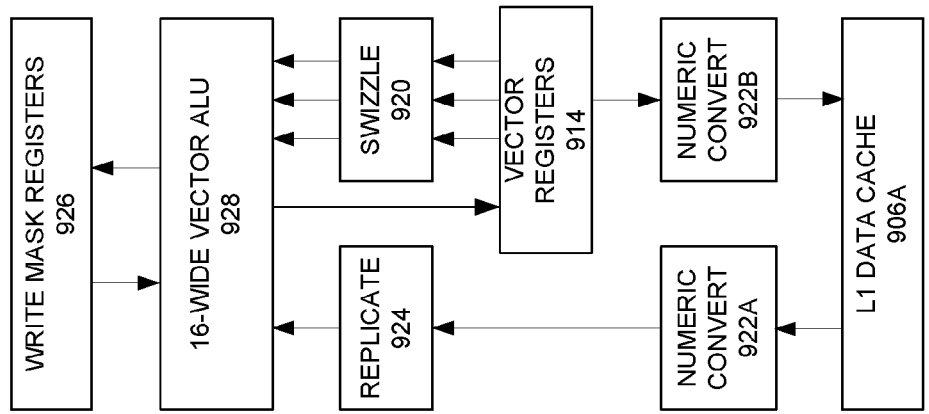
FIG. 9B is an expanded view of part of the processor core in FIG. 9A according to embodiments of the disclosure.
Figure 9A:
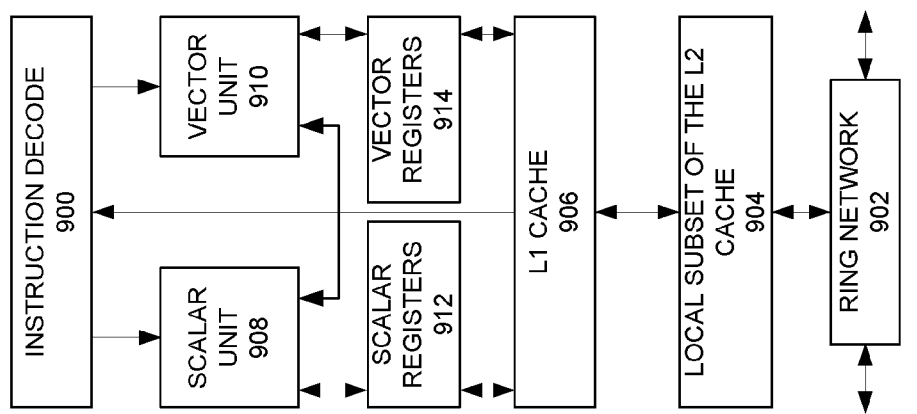
FIG. 9A is a block diagram of a single processor core, along with its connection to the on-die interconnect network and with its local subset of the Level 2 (L2) cache, according to embodiments of the disclosure.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decode unit 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
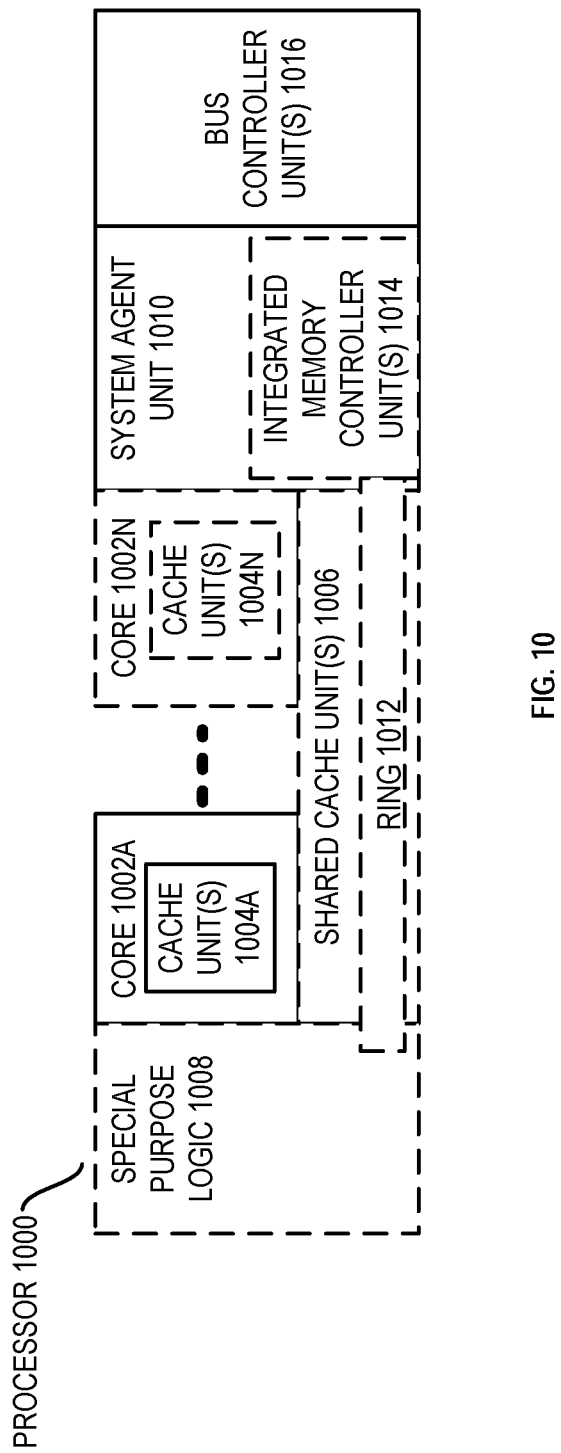
FIG. 10 is a block diagram of a processor that may have more than one core, may have an integrated memory controller, and may have integrated graphics according to embodiments of the disclosure.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
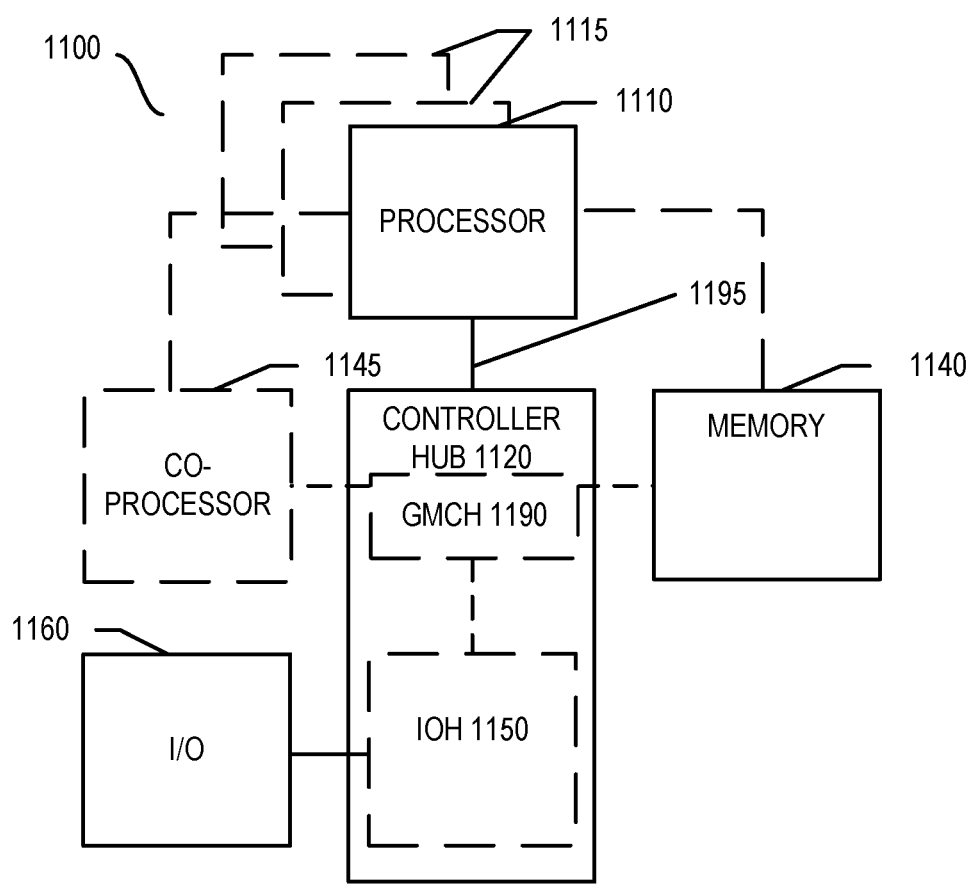
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
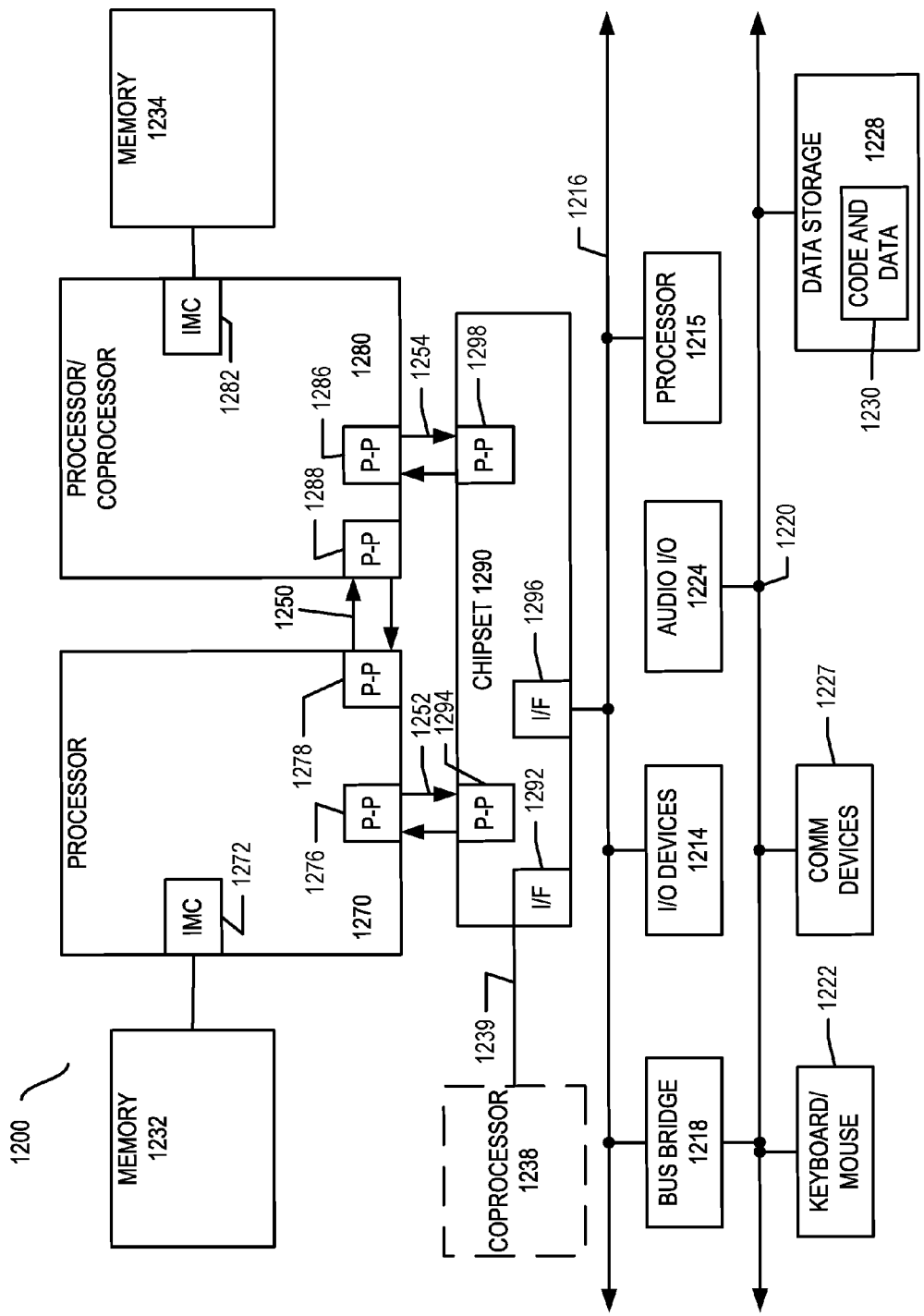
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
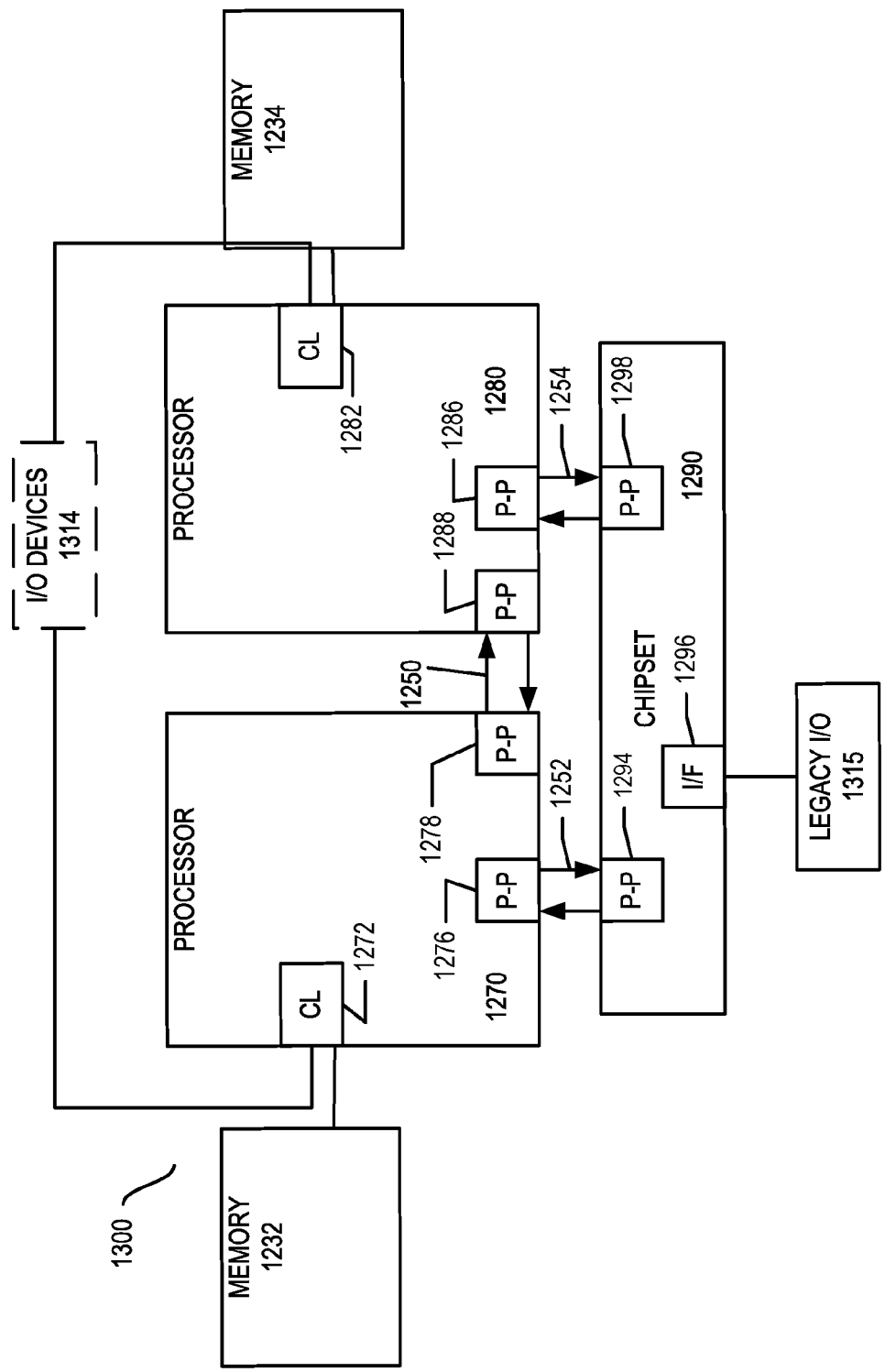
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
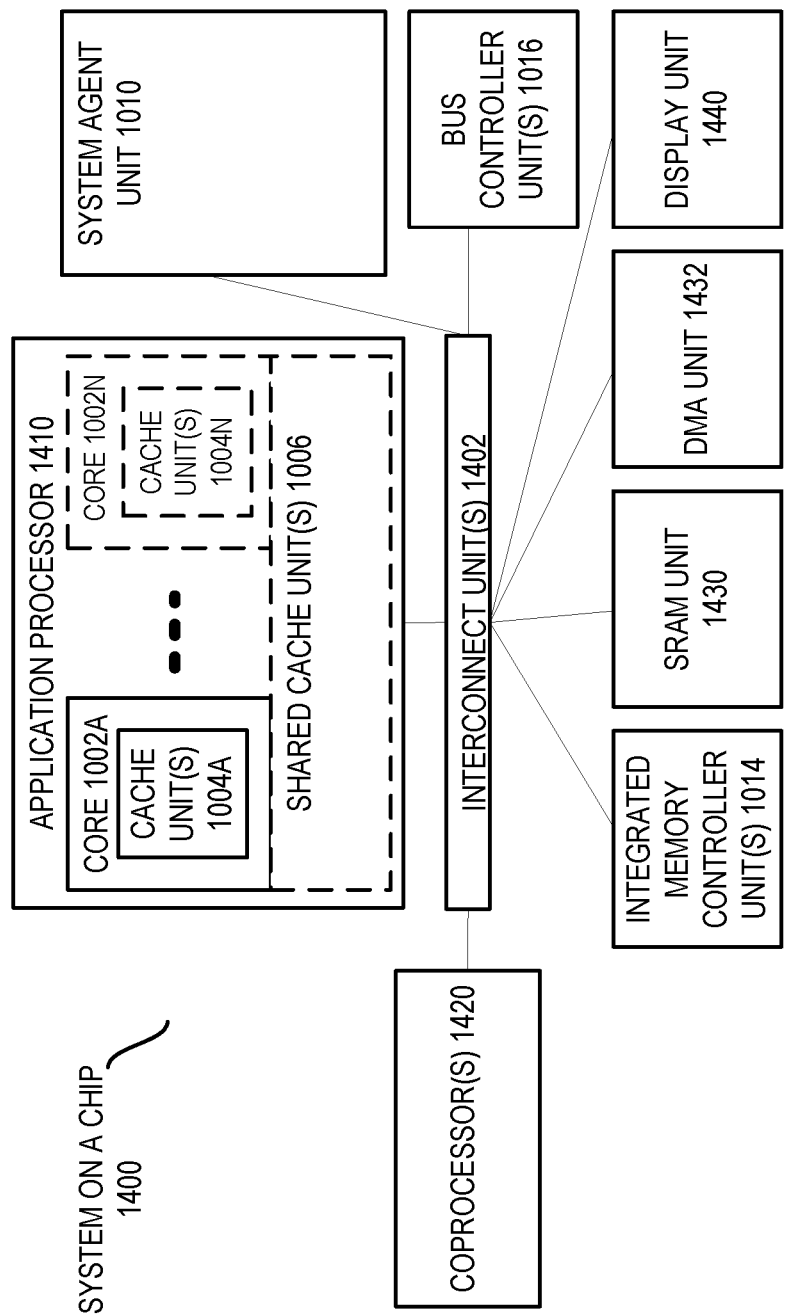
FIG. 14, shown is a block diagram of a system on a chip (SoC) in accordance with an embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. A hardware processor comprising:
a hardware decode unit to decode an instruction; and
a hardware execution unit to execute the instruction to:
pop a token for a thread from a shadow stack, wherein the token includes a shadow stack pointer for the thread with at least one least significant bit (LSB) of the shadow stack pointer overwritten with a bit value of an operating mode of the hardware processor for the thread,
remove the bit value in the at least one LSB from the token to generate the shadow stack pointer, and
set a current shadow stack pointer to the shadow stack pointer from the token when the operating mode from the token matches a current operating mode of the hardware processor.

2. The hardware processor of claim 1, wherein the operating mode of the hardware processor is selectable between a first operating mode with a first address size and a second operating mode with a second, larger address size, and the size of the token is the second, larger address size for both of a token for a thread in the first operating mode and a token for a thread in the second operating mode.

3. The hardware processor of claim 1, wherein the hardware execution unit is to generate a fault indication when an address of the token on the shadow stack is not a shadow stack address.

4. The hardware processor of claim 1, wherein an address for the token is an operand of the instruction.

5. The hardware processor of claim 4, wherein the hardware execution unit is to execute the instruction to:
align the shadow stack pointer from the token to a next address boundary,
remove a size of the token from the next address boundary to generate a second address, and
not set the current shadow stack pointer to the shadow stack pointer from the token when the second address does not match the address from the operand of the instruction.

6. The hardware processor of claim 1, wherein the hardware execution unit is to execute the instruction to clear the token from the shadow stack when the current shadow stack pointer is to be set to the shadow stack pointer from the token.

7. The hardware processor of claim 1, wherein:
the hardware decode unit is to decode a second instruction; and
the hardware execution unit is to execute the second instruction to:
copy the current shadow stack pointer for the thread to create a first value,
set at least one least significant bit (LSB) in the first value to indicate a current operating mode of the hardware processor to generate a second token, and
push the second token to the shadow stack.

8. A method comprising:
popping a token for a thread from a shadow stack of a hardware processor, wherein the token includes a shadow stack pointer for the thread with at least one least significant bit (LSB) of the shadow stack pointer overwritten with a bit value of an operating mode of the hardware processor for the thread;
removing the bit value in the at least one LSB from the token to generate the shadow stack pointer; and
setting a current shadow stack pointer to the shadow stack pointer from the token when the operating mode from the token matches a current operating mode of the hardware processor.

9. The method of claim 8, wherein the operating mode of the hardware processor is selectable between a first operating mode with a first address size and a second operating mode with a second, larger address size, and the size of the token is the second, larger address size for both of a token for a thread in the first operating mode and a token for a thread in the second operating mode.

10. The method of claim 8, further comprising generating a fault indication when an address of the token on the shadow stack is not a shadow stack address.

11. The method of claim 8, further comprising providing an address for the token in a request to set the current shadow stack pointer.

12. The method of claim 11, further comprising
aligning the shadow stack pointer from the token to a next address boundary,
removing a size of the token from the next address boundary to generate a second address, and
not setting the current shadow stack pointer to the shadow stack pointer from the token when the second address does not match the address provided in the request to set the current shadow stack pointer.

13. The method of claim 8, further comprising clearing the token from the shadow stack when the current shadow stack pointer is to be set to the shadow stack pointer from the token.

14. The method of claim 8, further comprising:
copying the current shadow stack pointer for the thread to create a first value;
setting at least one least significant bit (LSB) in the first value to indicate a current operating mode of the hardware processor to generate a second token; and
pushing the second token to the shadow stack.

15. A hardware processor comprising:
a hardware decode unit to decode an instruction; and
a hardware execution unit to execute the instruction to:
copy a current shadow stack pointer for a thread to create a first value,
overwrite at least one least significant bit (LSB) in the first value with a bit value to indicate a current operating mode of the hardware processor for the thread to generate a token, and
push the token to a shadow stack.

16. The hardware processor of claim 15, wherein the current operating mode of the hardware processor is selectable between a first operating mode with a first address size and a second operating mode with a second, larger address size, and the size of the token is the second, larger address size for both of a token for a thread in the first operating mode and a token for a thread in the second operating mode.

17. The hardware processor of claim 15, wherein the hardware execution unit is to generate a fault indication when an address where the token is to be pushed is not a shadow stack address.

18. The hardware processor of claim 15, wherein the hardware execution unit is to execute the instruction to:
align the current shadow stack pointer from the token to a next address boundary to generate a second value; and
set the second value as a next shadow stack pointer.

19. The hardware processor of claim 15, wherein:
the hardware decode unit is to decode a second instruction; and
the hardware execution unit is to execute the second instruction to:
pop the token for the thread from the shadow stack,
remove the bit value in the at least one LSB from the token to generate a new shadow stack pointer, and
set a next shadow stack pointer to the new shadow stack pointer from the token when an operating mode from the token matches the current operating mode of the hardware processor.

20. A method comprising:
copying a current shadow stack pointer of a hardware processor for a thread to create a first value;
overwriting at least one least significant bit (LSB) in the first value with a bit value to indicate a current operating mode of the hardware processor for the thread to generate a token; and
pushing the token to a shadow stack.

21. The method of claim 20, wherein the current operating mode of the hardware processor is selectable between a first operating mode with a first address size and a second operating mode with a second, larger address size, and the size of the token is the second, larger address size for both of a token for a thread in the first operating mode and a token for a thread in the second operating mode.

22. The method of claim 20, further comprising generating a fault indication when an address where the token is to be pushed is not a shadow stack address.

23. The method of claim 20, further comprising:
aligning the current shadow stack pointer from the token to a next address boundary to generate a second value; and
setting the second value as a next shadow stack pointer.

24. The method of claim 20, further comprising:
popping the token for the thread from the shadow stack,
removing the bit value in the at least one LSB from the token to generate a new shadow stack pointer, and
setting a next shadow stack pointer to the new shadow stack pointer from the token when an operating mode from the token matches the current operating mode of the hardware processor.

* * * * *